United States Patent
Ichiyama

(10) Patent No.: US 6,339,270 B1
(45) Date of Patent: Jan. 15, 2002

(54) MOTOR FOR DRIVING STORAGE DISKS, AND STORAGE DISK DRIVE DEVICE PROVIDED THEREWITH

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/476,128

(22) Filed: Jan. 3, 2000

(30) Foreign Application Priority Data

Jan. 5, 1999 (JP) ............................................. 11-000330

(51) Int. Cl.[7] ................................................. H02K 5/16
(52) U.S. Cl. ...................... 310/67 R; 310/90; 310/90.5; 360/98.06
(58) Field of Search ................................. 310/90, 67 R, 310/90.5; 384/112, 102, 123, 107, 111; 360/98.06, 99.04, 98.07

(56) References Cited

U.S. PATENT DOCUMENTS

| | | | | |
|---|---|---|---|---|
| 4,200,344 A | * | 4/1980 | Binns et al. ..................... | 308/9 |
| 4,673,997 A | * | 6/1987 | Gowda et al. ............... | 360/107 |
| 4,998,033 A | * | 3/1991 | Hisabe et al. ............. | 310/67 R |
| 5,122,697 A | | 6/1992 | Horst .......................... | 310/181 |
| 5,322,369 A | * | 6/1994 | Kataoka et al. ................ | 384/1 |
| 5,574,322 A | * | 11/1996 | Nii et al. ..................... | 310/90.5 |
| 5,675,201 A | * | 10/1997 | Komura et al. ............ | 310/90.5 |

FOREIGN PATENT DOCUMENTS

| | | |
|---|---|---|
| JP | 10-69713 | 3/1998 |
| JP | 10-267036 | 10/1998 |

* cited by examiner

*Primary Examiner*—Nestor Ramirez
*Assistant Examiner*—Thanh Lam
(74) *Attorney, Agent, or Firm*—James Judge

(57) ABSTRACT

An axial-gap type storage disk drive motor and storage disk drive configuration is disclosed. The motor includes a stator around retaining cylinder retaining a support sleeve, a storage-disk-carrying rotor, and radial and thrust bearings having striation patterns on the bearing surfaces to develop controlled radial and thrust load-bearing dynamic pressure in an intervening lubricating fluid. The thrust bearing is formed between the upper end of the support sleeve and the rotor. A set of salient poles projecting axially inward is furnished on a bottom face of the rotor hub, axially opposing the stator. The configuration establishes a reluctance type motor: energizing the stator magnetically attracts axially the salient poles on the rotor hub in imparting rotational power thereto. Meanwhile, the magnetic attractive force imparted in the rotor is designed to balance the thrust load-bearing pressure generated in the thrust bearing. The configuration enables the motor to be made thinner and eliminates the need for rotor magnets, curtailing the number of parts, reducing costs, and preventing magnetic contamination caused by magnetic powder/particles from the motor.

27 Claims, 9 Drawing Sheets

MOTOR FOR DRIVING STORAGE DISKS, AND STORAGE DISK DRIVE DEVICE PROVIDED THEREWITH

BACKGROUND OF THE INVENTION

1. Technical Field

The present invention relates to motors for driving storage disks in order to drive, for example, hard disks and like storage disks, as well as to storage disk drive devices provided with the motors. In particular the present invention relates to a motor, and to a storage-disk drive device for rotary-driving storage disks with the motor, wherein fluid dynamic pressure bearings function to support the rotor rotatively against the stator element.

2. Description of Related Art

Motors, and storage-disk drive devices for rotary-driving storage disks with the motors, have been known conventionally wherein fluid dynamic pressure bearings are employed for relative, rotational support of a shaft and a sleeve member encompassing the shaft.

Japanese Laid-Open Patent Application No. 10-267036 discloses a storage disk drive motor used in a disk drive device. The disk drive motor includes a bracket, a cylindrical sleeve fixedly attached to the approximate center of the bracket, a shaft inserted within the sleeve, and a rotor hub fixed to one end of the shaft for integrally rotating with the shaft. A rotor magnet is attached to the inner peripheral surface of the rotor hub. A stator is disposed on the bracket so as to oppose the rotor magnet in the radial direction, and such that the magnetic centers of the rotor magnet and the stator are set apart axially, i.e., not coincident. As a means for supporting the radial load, the motor also has a pair of radial bearings formed by the outer peripheral surface of the shaft and the inner peripheral surface of the sleeve, at an axial separation. At the same time, as a means for supporting the thrust (axial) load, the motor also has a thrust bearing formed by an end face of the shaft, and a thrust plate that occludes the bottom portion of the sleeve and axially opposes the shaft end face.

When electric current is supplied to the stator in conventional disk-drive motors, a rotating magnetic field is generated between the rotor magnet and the stator, which rotates the rotor hub in a predetermined direction. When the rotor hub rotates, a lubricating fluid flows in a predetermined direction through dynamic-pressure generating grooves in the radial and thrust bearings, which develops dynamic pressure that supports the rotor hub axially against the shaft.

Further, by forming the thrust bearing portion on the end face of the shaft and the thrust plate only, pressure for supporting the thrust load acts unidirectionally only, in the axial direction. Meanwhile the magnetic centers of the rotor magnet and the stator are at an axial displacement, which compels a magnetic attractive force between the rotor magnet and the bracket, by which the magnetic attractive force and the thrust load-bearing pressure of the thrust bearing are balanced.

In conventional disk-drive devices, as in the foregoing, the magnetic attractive force between the rotor magnet and the stator is in balance with the thrust load bearing pressure acting in the axial direction unidirectionally only. Nevertheless, when the motor rotates at low speed, or is accelerating/decelerating, the thrust load bearing pressure does not balance the magnetic attractive force. Out of balance the magnetic attractive force is exaggerated and brings bearing component parts into contact, leading to their progressive detrition. As a result, the reliability of the motor deteriorates.

Personal computers employing storage disk drive devices driven by conventional motors continue to be made smaller and thinner. Thus the motors that rotate the storage disk in such disk drives presumably are to be made smaller and thinner as well. The magnetic attractive force acting between the stator and rotor magnet establishes a balancing mechanism between the two in their axial opposition. The axial positions and tilt of the stator and rotor magnet affect the magnetic attractive force, however, making this balancing mechanism unsuitable for thinner-type disk drive devices, which require high precision in assembly to maintain stability in device performance.

Other conventional fluid dynamic pressure bearings are known, such as is disclosed in Japanese Laid-Open Patent Application No. 10-69713. Therein a rotor magnet axially opposes the stator, and dynamic pressure-generating grooves are formed superficially on one end of the shaft, without a thrust plate being employed.

The motor employs fluid dynamic pressure bearings for rotary support of the rotor hub without contact. In this case, since the rotor magnet and stator are arranged in axial opposition, during rotation of the motor magnetic attractive and repulsive forces repeatedly occur, which destabilizes the rotor hub rotation.

Where these conventional motors thus requiring rotor magnets are employed in a hard-disk drive, magnetic powder or particles produced when the magnet is formed or during motor assembly is liable to stick to the recording surface of the storage disk that the motor drives, or to the disk magnetic data read/write head. This causes magnetic contamination that hinders correct reading and writing of data, or worse, destroys data recorded on the disk. Further, the expense of the magnet itself increases the cost of motors in which such magnets are used, and of storage disk drive devices employing the motors.

SUMMARY OF THE INVENTION

An object of the present invention is to provide a thin storage disk drive motor.

Another object is to provide a storage disk drive motor that is simple in construction and operates with sufficient stability.

A further object of the present invention is to provide a storage disk drive motor which is manufactured and assembled easily.

A yet other object of the invention is to provide a storage disk drive motor the manufacturing costs of which are reduced.

A yet further object is to configure a storage disk drive motor for low electric-power consumption.

Further, an object of the present invention to configure a storage disk drive device furnished with a storage disk drive motor that is made thin, is readily manufactured and assembled, and moreover inexpensive, and at the same time is low power-consuming.

A still further object of the present invention is to provide a thin motor that is simple in construction and operates with high stability.

A still another object of the present invention is to provide a disk drive device which is thin and reliable due to thinness and stability of a disk drive motor provided therein.

A still other object of the present invention is to provide a thin reluctance motor that is simple in construction and operates with high stability.

A storage disk drive motor of the present invention is provided with: a stationary member; a rotary member on which at least one storage disk is loaded for rotating freely relative to the stationary member; and a thrust bearing generating thrust load-supporting pressure in response to rotation of the rotary member. A plurality of projections jutting axially inward is provided on the rotary member and a stator is provided on the stationary member so as to oppose axially the aforesaid plurality of projections. Electromagnetic force arising due to energization and/or excitation in the stator magnetically attracts the rotary member axially inward. The thrust bearing generates thrust load-bearing pressure that acts axially outward only, which balances the magnetic attractive force by the stator for the rotary member and the thrust load-bearing pressure that develops in the thrust bearing.

The storage disk drive motor of the present invention is furnished with a plurality of salient poles jutting axially inward on the bottom face of the rotary member, and is organized in a so-called axial-gap type motor construction wherein the stator and the salient poles oppose axially. At the same time a so-called reluctance type motor construction is established, wherein the motor gains rotational power through excitation of the stator to magnetically attract the salient poles provided on the bottom face of the rotary member. Therefore, the electromotive force of the stator magnetically attracts the rotary member axially, balancing it with the thrust load-bearing pressure generated in the thrust bearing, acting axially outward only. In addition, rotor magnets being unnecessary for reluctance-type motors curtails the number of parts, reduces costs, and at the same time prevents magnetic contamination caused by magnetic powder and/or particles from the motor from occurring.

Preferably, the salient poles are formed integrally with the rotary member, which is made from a magnetic material. Wherein the rotary member is to be made from an non-magnetic material, the salient poles can be formed by laminating a plurality of thin, wafer-shaped magnetic elements, fitted with a means for fastening them to the bottom face of the rotary member.

Forming the thrust bearing between the upper end-face of a sleeve of the stationary member and the bottom face of the rotary member also enables slimming down of the storage disk drive motor, while maintenance of posture—e.g., of the core deflection—when the rotary member rotates is controlled with a radial bearing generating radial load-supporting pressure in response to rotation of the rotary member.

Furthermore, the rotary member positioned in the upper portion of the motor comprises a part of the thrust bearing. Therefore, posture-control during rotation is facilitated compared with the situation in which rotation is supported by a shaft descending from the rotary member—for example, such as wherein a thrust plate is utilized. At the same time, susceptibility to margin of error in the elements comprising the thrust bearing, as well as in the precision and strength of the shaft and the rotary member connections, is slight, which facilitates assembly and enables improved productivity of the motors. Further, within the tolerance ranges of the superficial precision of the rotary member bottom face, and of the sleeve upper end face that compose the thrust bearing, the micro-gap between the thrust bearing can be set smaller (narrower). This boosts bearing rigidity of the thrust bearing, and improves the thrust load-bearing pressure.

Employing the foregoing storage disk drive motor, moreover, enables a storage disk drive device of the present invention to be slimmed, readily manufactured and assembled, lowered cost, and low power-consuming.

The foregoing and other objects, features, aspects and advantages of the present invention will become more apparent from the following detailed description in conjunction with the accompanying drawings.

DETAILED DESCRIPTION OF THE PREFERRED EMBODIMENTS

With reference to the drawings the following explains embodiments of a storage disk drive device in connection with the present invention; the present invention is not, however, limited to the respective embodiments illustrated below.

Figure 1:
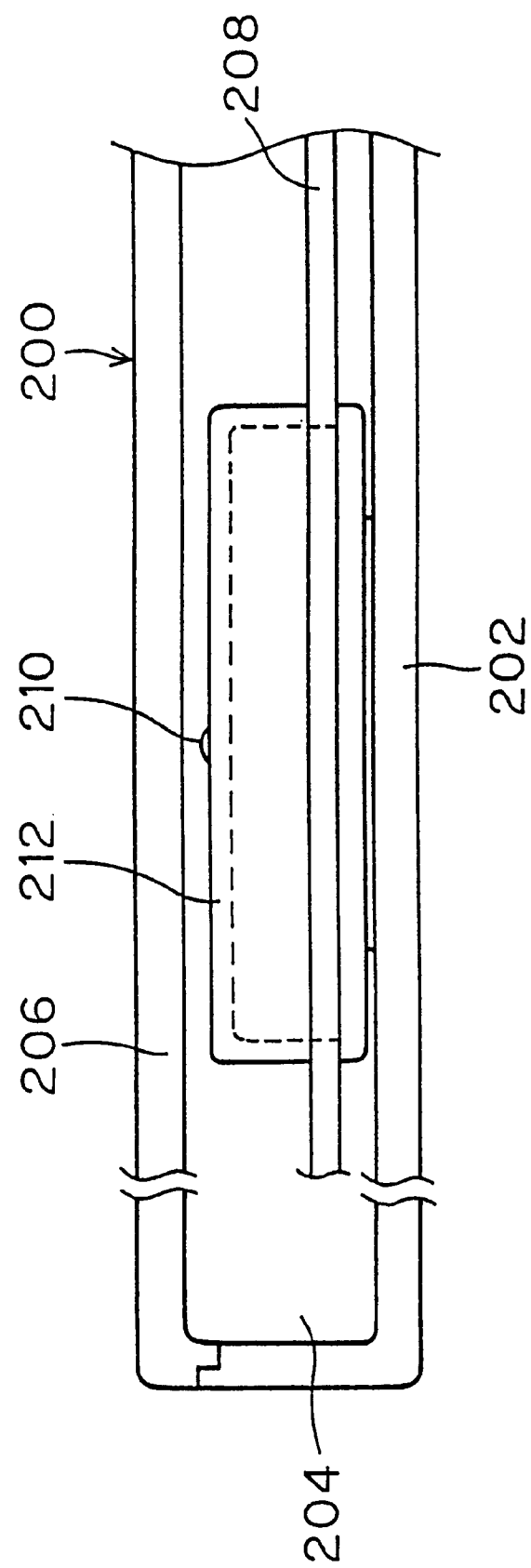
FIG. 1 is a vertical section view schematically illustrating principal component configuration in a storage disk drive device of the present invention.

FIG. 1 is a vertical section view schematically illustrating a configurational outline of chief parts in a storage disk drive device of the present invention.

Referring to FIG. 1, the storage disk drive device is provided with: a base element 202 on which the storage disk drive motor is supported; a housing 200 formed by the base element 202 and an upper cover 206, and in turn forming a clean chamber 204 for accommodating the storage disk drive motor; and a clamp element 212 fixed by a screw 210 to the rotor hub of the storage disk drive motor for retaining a storage disk such as a hard disk carried by the rotor hub of the storage disk drive motor.

Figure 2A:
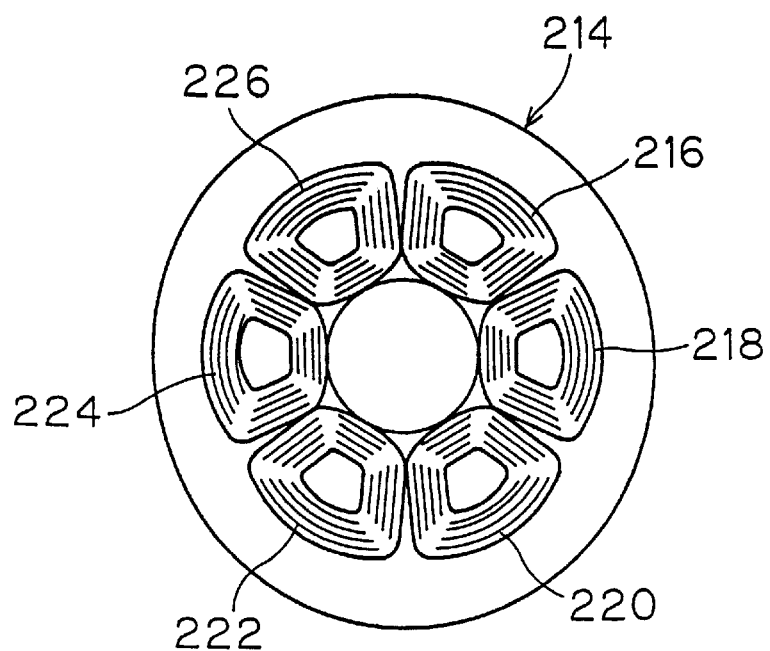
FIG. 2(A) is a plan view schematically illustrating the stator of a storage disk drive motor employed in a storage disk drive device of the present invention.
Figure 2B:
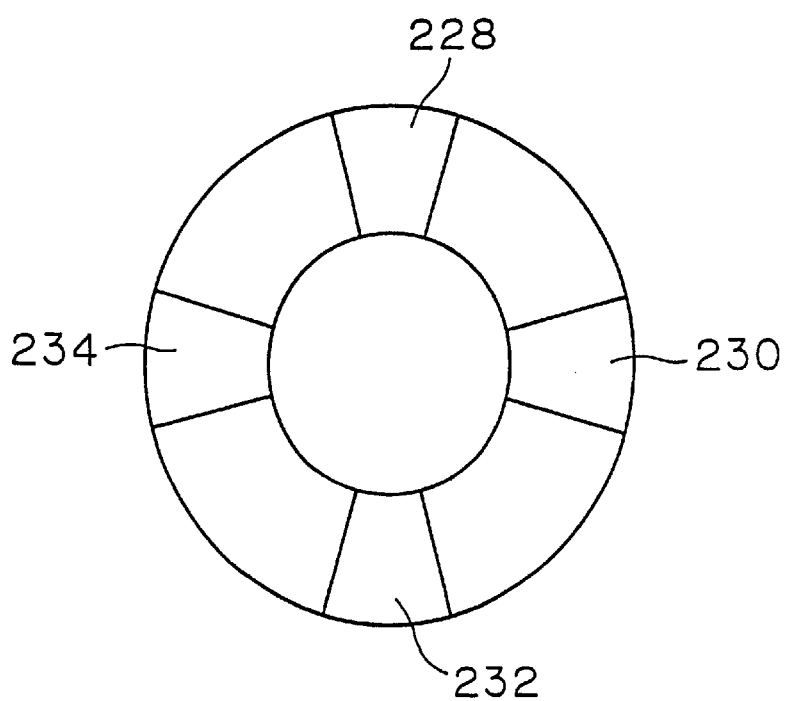
FIG. 2(B) is a plan view schematically illustrating salient poles of a storage disk drive motor employed in a storage disk drive device of the present invention.

FIG. 2(A) and 2(B) depict the stator and salient poles of a storage disk drive motor employed in the storage disk drive device of the present invention shown in FIG. 1.

As shown in FIG. 2(A), six magnetic poles wound with stator windings 216, 218, 220, 222, 224 and 226 are disposed evenly spaced circumferentially to compose the stator 214 for the storage disk drive motor of the present invention. A later-described rotor hub provided with salient poles 228, 230, 232 and 234 shown in FIG. 2(B) axially opposes the stator 214, wherein an axial-gap type reluctance motor is configured. Also, each pair of the stator windings 216 and 222, 218 and 224, and 220 and 226 are respectively connected in series with each other in the same direction, constituting triple-phase stator windings.

Electric current staggered by 120° phases sequentially energizes the stator winding pairs 216 and 222, 218 and 224, and 220 and 226 on the stator 214 configured in the foregoing manner, which forms a rotating magnetic field around the magnetic poles of the stator 214. In the magnetic attraction of the salient poles 220 through 234 to the rotating magnetic field, the rotor hub follows the switching of the stator windings being energized, rotating about its axis of rotation.

Figure 3:
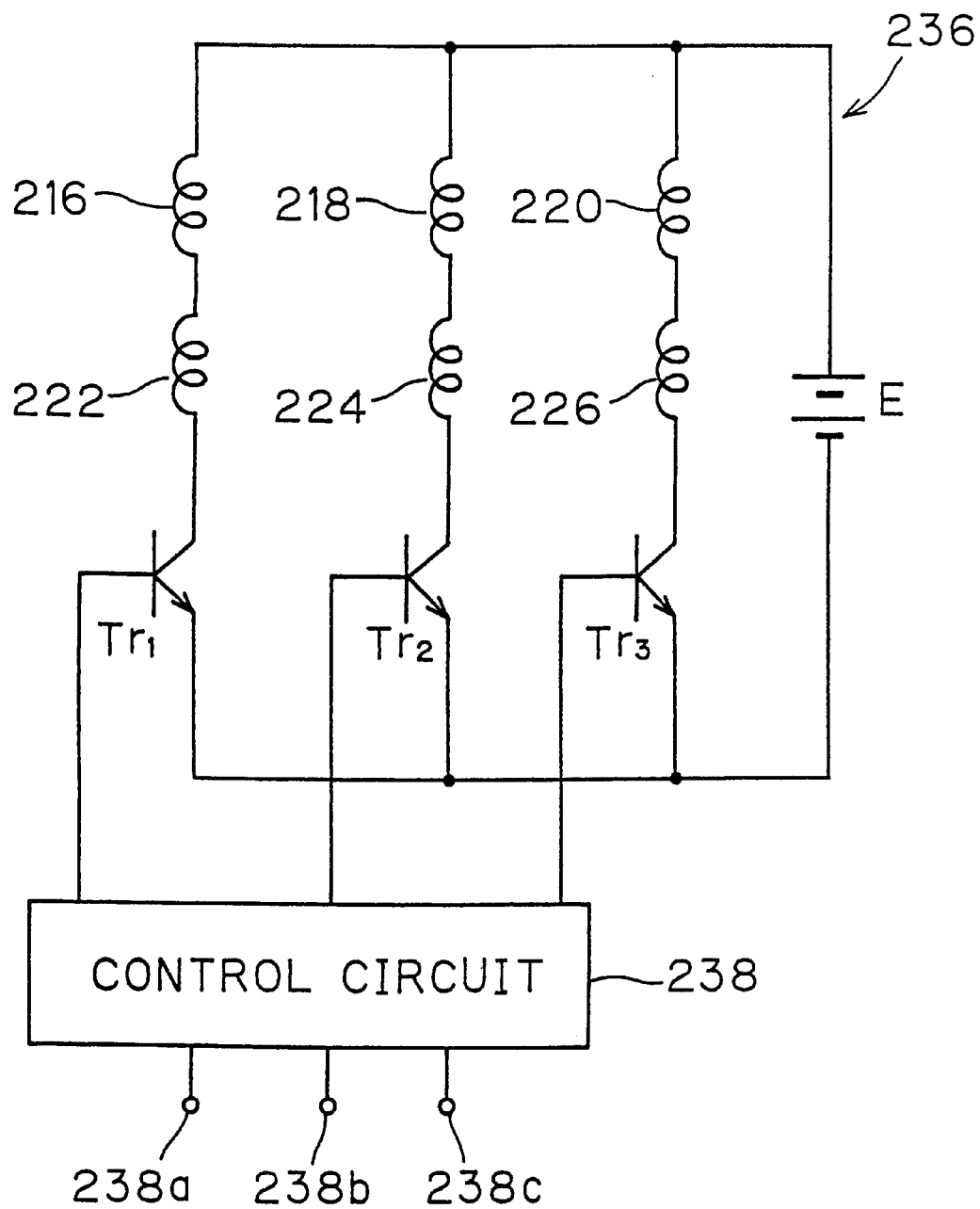
FIG. 3 is a schematic circuit diagram of a drive circuit for a storage disk drive motor employed in a storage disk drive device of the present invention.

FIG. 3 depicts a drive circuit for controlling energization of the stator windings 216 through 226 of the stator 214.

The drive circuit 236, as shown in FIG. 3, is provided with: transistor $Tr_1$ connected in series to stator windings 216 and 222; transistor $Tr_2$ connected in series to stator windings 218 and 224; transistor $Tr_3$ connected in series to stator windings 220 and 226; and a control circuit 238 that controls switching the transistors $Tr_1$ through $Tr_3$ ON/OFF. Further, a direct-current power source E is connected respectively to each of the series circuits for the stator windings 216, 222 and transistor $Tr_1$, the stator windings 218, 224 and transistor $Tr_2$, and the stator windings 210, 222 and transistor $Tr_3$.

Further, control terminals 238a, 238b and 238c are associated with control circuit 238. When a control signal is input to control terminal 238a, transistor $Tr_1$ is conductive (ON) while the signal is being input; transistors $Tr_2$ and $Tr_3$ are ON while a control signal is input to control terminal 238b and to control terminal 238c, respectively. Accordingly, the stator winding connected to the ON transistor is energized. Also, to prevent transistor breakdown by the reverse electromotive force induced in the stator windings when the transistors go OFF from ON, it is preferable to have a protection diode connected in parallel to each transistor.

The following describes, with reference to FIG. 4 through 13, a storage disk drive motor employed in the storage disk drive device illustrated in FIG. 1.

Figure 4:
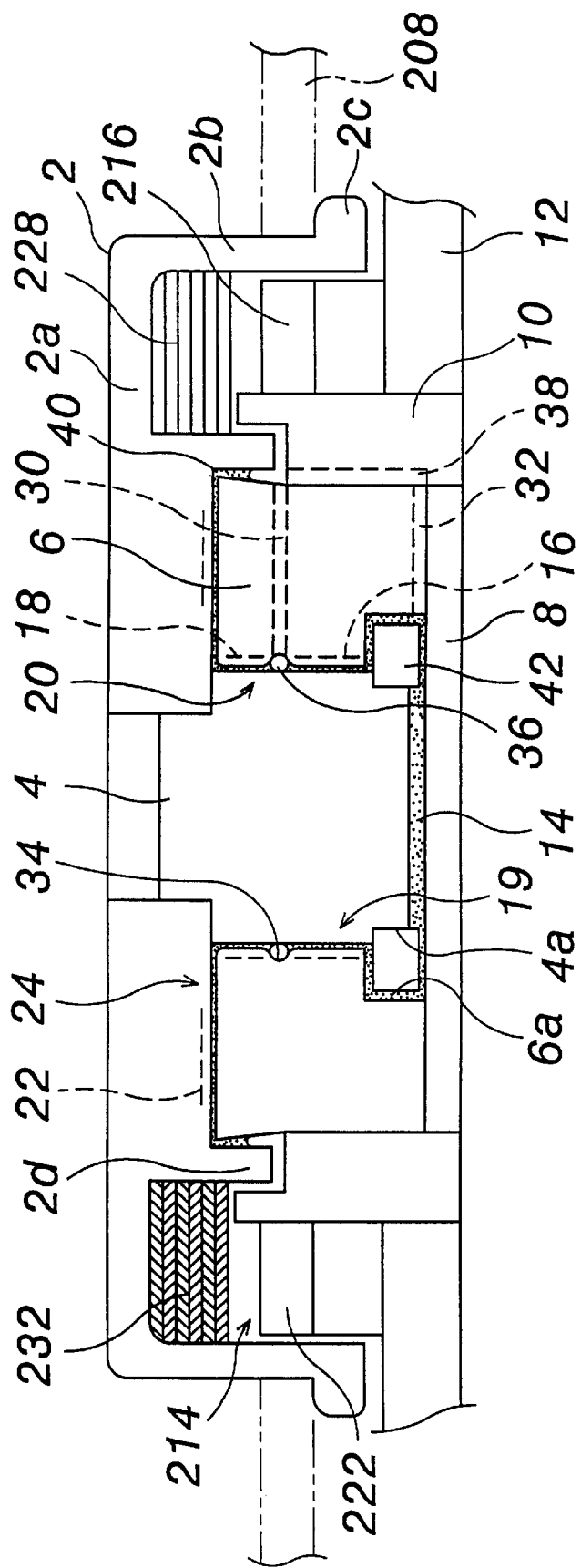
FIG. 4 is a vertical section view outlining a principal component configuration of a storage disk drive motor employed in a storage disk drive device of the present invention in a first embodiment.

FIG. 4 is a vertical section view schematically illustrating a configurational outline of chief parts in a storage disk drive motor 1 employed in the storage disk drive device according to a first embodiment of the present invention.

The storage disk drive motor 1 in FIG. 4 includes a rotor hub 2 and a shaft 4. The rotor hub 2 is composed of: an approximately disk-shaped upper wall portion 2a; a cylindrical circumferential wall portion 2b depending from the periphery of the upper wall portion 2a; and a flange portion 2c projecting radially outward from the lower end of the circumferential wall portion 2b to support the storage disk 208, which is indicated in FIG. 4 by phantom lines. The shaft 4 constitutes part of a rotary component. One end of the shaft 4 is fixedly fitted in the central portion of the upper wall portion 2a of the rotor hub 2. A support sleeve 6, a hollow cylindrical element, rotatively supports the shaft 4. The support sleeve 6 may be relatively thinner axially than would appear from the figures. A retaining cylinder 10 retains the support sleeve 6; the retaining cylinder 10 is anchored into a bracket 12 centrally. The bracket 12 is attached to the base element 202, shown in FIG. 1. Disk-shaped cover 8 is engage-fitted into the retaining cylinder 10 at the lower end of the inner periphery of the support sleeve 6, closing off the opening on one side of the hollow cylindrical support sleeve 6.

A lubricating fluid such as lubrication oil is retained in the micro-gaps formed between the upper wall portion 2a of the rotor hub 2, the shaft 4, the support sleeve 6, and the cover 8 by capillarity. Radial bearing portions 19 and 20 are configured for generating radial load-bearing pressure in the lubricating fluid 14 by the action of radial dynamic pressure-generating grooves 16 and 18. Indicated in FIG. 4 by hidden lines, the grooves 16 and 18 are formed on the inner circumferential surface of the support sleeve 6 radially opposing the outer circumferential surface of the shaft 4. Furthermore, a thrust bearing portion 24 is configured for generating thrust load-bearing pressure in the lubricating fluid 14 by the action of thrust dynamic pressure-generating grooves 22. Indicated in FIG. 4 by hidden lines, the grooves 22 are formed on the bottom face of the upper wall portion 2a axially opposing the upper end face of the support sleeve 6.

The radial dynamic pressure-generating grooves 16 and 18 as well as the thrust dynamic pressure-generating grooves 22 are for convenience indicated by hidden lines in FIG. 4, but their specific shapes/configurations will later be described in detail with reference to the drawings.

The salient poles 228 through 234, depicted in FIG. 2(B), are formed spaced at regular circumferential intervals on the underside of the upper wall portion 2a of the rotor hub 2, from which they project axially downward to oppose axially, at a gap, the stator windings 216 through 226 of the stator 214, depicted in FIG. 2(A). With the shaft 4 supported within the element 6 and the cover 8, the salient poles 228 through 234 cooperate with the stator windings 216 through 226 to drive the rotor hub 2 and the shaft 4.

In the storage disk drive motor, the stator windings 216 through 226 of the stator 214, as being energized in the manner described above magnetically attract the salient poles 220 through 234. Tailing the switching as the FIG. 3 drive circuit 236 energizes the windings, the rotor hub 2 rotates on its axis of rotation. Sliding wear can arise from the components that form the radial bearing portions 19 and 20 and the thrust bearing portion 24 contacting at motor actuation/halting and during low-speed rotation when sufficient load-bearing pressure cannot be generated. To reduce sliding wear, the electromagnetic force by the stator 214 attracting the three salient poles is preferably controlled by intermittent energization of or low-current supply to the stator windings 216 through 226, during the period until the rotor hub 2 reaches a predetermined number of revolutions.

The salient poles 228 through 234 are formed integrally with the rotor hub 2 out of a magnetic material, or can be prepared by such means as fastening on the rotor hub 2 salient poles formed by laminating a plurality of thin, wafer-shaped magnetic elements.

The support sleeve 6 is formed from metallic material such as copper/copper alloy, or stainless steel. In order to communicate the radial bearing portions 19 and 20 with the external atmosphere, first and second ventilation bores 30 and 32 are formed in the support sleeve 6. The first ventilation bore 30 is formed in the radial direction so as to open on the outer circumferential surface, exposing the radial bearing portions 19 and 20 and the support sleeve 6 to the open air. The second ventilation bore 32 opens on the lower end axially of the radial bearing portion 19. An annular depression 34 is formed at the position where the first ventilation bore 30 opens on the inner circumferential surface of the support sleeve 6, meanwhile forming an air intervention 36 for mediating air in between the annular depression 34 and the outer circumferential surface of the shaft 4. The radial bearing portions 19 and 20 are axially separated by the air intervention 36. Further, the second ventilation bore 32 is connected to a communicating channel 38 formed in the axial direction so as to open at the upper end face of the support plate 6.

The radial bearing portions 19 and 20 are liberated to the external atmosphere by the first ventilation bore 30 and the second ventilation bore 32, as well as the communicating channel 38. Bubbles are liable to appear in the lubricating fluid 14 intervening in the radial bearing portions 19 and 20 when the lubricant fluid 14 is filled in the micro-gaps, or when the fluid 14 is agitated by the grooves 16, which are herringbone shaped, and the grooves 18, which are spiral shaped, during rotation of the motor. The bubbles discharge to the exterior of the bearing through the first and second ventilation bores 30 and 32 as well as the communicating channel 38, thus preventing the lubricating fluid 14 from leaking out to the exterior of the bearing by thermal expansion of the bubbles due to temperature elevation in the motor.

A circular projection 2d, furthermore, is formed on the bottom face of the upper wall portion 2a of the rotor hub 2, opposing the circumferential surface of the support plate 6 at a spacing. At the radially outward end of the thrust bearing portion 22, a tapered seal 40 is provided that is a sealing structure formed cooperatively by the circular projection 2d and the support sleeve 6.

Moreover, an annular notch 4a is formed on the lower end of the shaft 4. A ring element 42 is fastened into the annular notch 4a, protruding radially outward from the circumferential surface of the shaft 4. An annular recess 6a is formed in the inner circumferential surface of the support sleeve 6 at a position opposing the ring element 42. The annular recess 6a accommodates the ring element 42 to form a structure that prevents the shaft 4 from slipping out. Further, the ring element 42 is attached to the shaft 4 projecting axially somewhat lower than the lower end of the shaft 4. And the micro-gap between the end face of the shaft 4 and the cover 8 is set comparatively larger than the micro-gaps between the other components, and functions as a reservoir for the lubricating fluid 14. Accordingly, it should be understood that neither the ring element 42 nor the surfaces defining the micro-gap between the end face of the shaft 4 and the cover 8 function to provide thrust load-bearing pressure during rotational operation of the motor.

Through the foregoing configuration accordingly: with energization in the stator windings 216 through 226 the set of salient poles 228 through 234 provided on the bottom face of the rotor hub 2 is magnetically attracted; the rotor hub 2 and the shaft 4, in response to the switching as the control circuit 236 shown in FIG. 3 energizes the windings, are rotationally driven within the support sleeve 6 and the cover 8; in the thrust bearing portion 24, by rotation of the rotor hub 2, the lubricating fluid 14 in the gap between the rotor hub 2 upper wall portion 2a and the support sleeve 6 generates, by the action of the herringbone grooves 22 a thrust load-bearing pressure acting axially outward only; in the radial bearing portions 19 and 20, furthermore, with the rotation of the shaft 4, the lubricating fluid 14 in the gap between the shaft 4 and the support sleeve 6 generates a radial load-bearing pressure by the action of the herringbone grooves 16 and the spiral groves 18.

Therein, the magnetic attractive force toward the bracket 12 (axially inward) that is imparted to the rotor hub 2 and the shaft 4 by the stator 214, and the thrust load-bearing pressure generated in the thrust bearing portion 24 balance into equilibrium.

As described in the foregoing, the thrust bearing portion 24 is provided between the upper wall portion 2a of the rotor hub 2 and the support sleeve 6. The configuration is such that the magnetic attractive force in the rotor hub 2 due to the stator 214 balances buoyancy in the rotary component (the rotor hub 2, the shaft 4, etc.) that the thrust bearing portion 24 generates. It is therefore unnecessary to configure the thrust bearing to generate thrust load-bearing pressure upward and downward in the vertical direction along the axis as in conventional structures, thereby reducing the bearing-constituting components that demand precision manufacturing, which facilitates managing the production process and serves to lower the cost of the storage disk drive motor.

Moreover, using a reluctance motor as a storage disk drive motor wherein the motor drive power is gained by magnetically attracting a ferromagnetic material makes rotation of the rotor hub 2 stable, and improves the rotation characteristics—compared with permanent magnet motors wherein during rotation magnetic attraction and repulsion repeat continually.

In addition, absence of a permanent magnet avoids magnetic contamination due to magnetic powder or particles produced when the permanent magnet is formed, or wherein the motor is assembled. This particularly suits storage disk drive devices such as hard disk drives, which require clean space, and at the same time reduces the number of parts and lowers cost.

Figure 5:
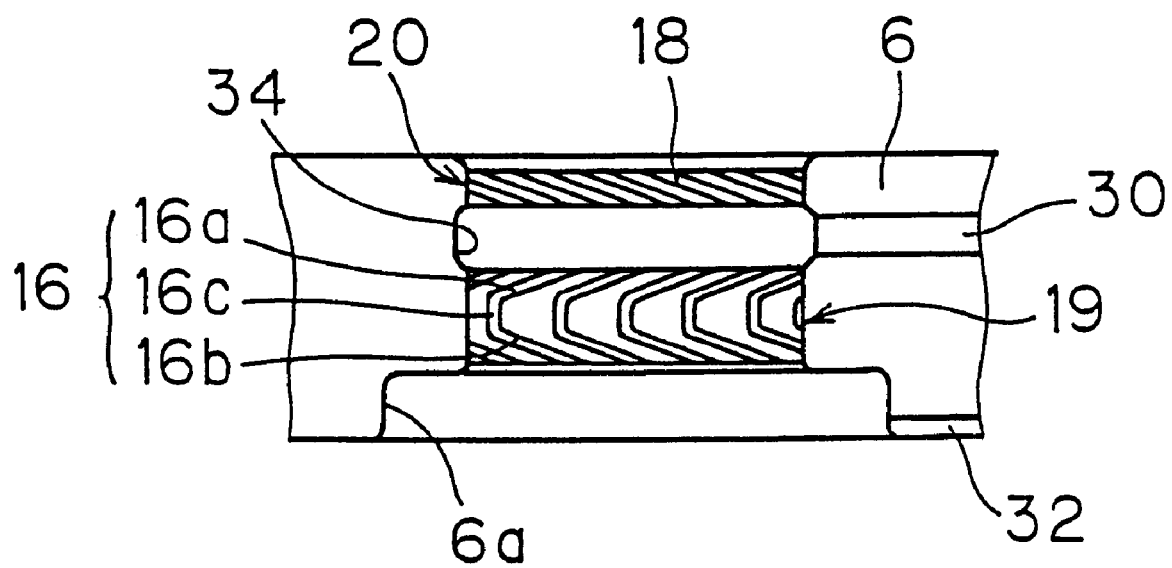
FIG. 5 is a fragmentary section view illustrating a specific example of a radial bearing for the motor shown in FIG. 4.
Figure 6:
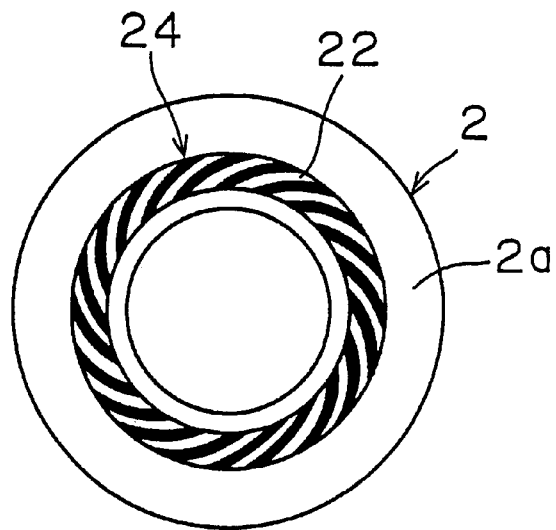
FIG. 6 is a fragmentary section view illustrating a specific example of a thrust bearing for the motor shown in FIG. 4.
Figure 7:
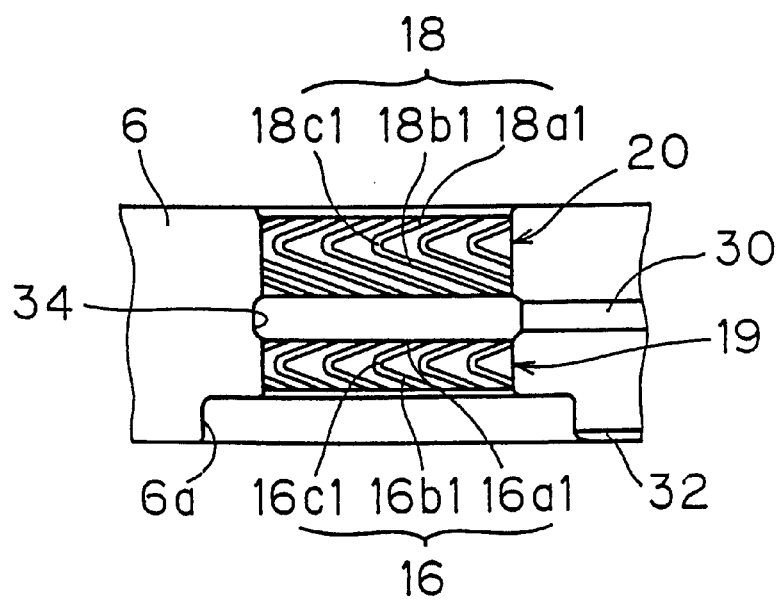
FIG. 7 is a fragmentary section view illustrating another specific example of a radial bearing for the motor shown in FIG. 4.

With reference to FIG. 5 through FIG. 7, the following describes in detail the specific shape and form of the radial dynamic-pressure generating grooves 16 and 18 as well as the thrust dynamic pressure generating grooves 22, indicated by hidden lines in FIG. 4, and formed in the radial bearing portions 19 and 20 as well as the thrust bearing portion 24.

As radial dynamic-pressure generating grooves 18, in FIG. 5 spiral striations are formed in the upper radial bearing portion 20, for urging lubricating fluid 14 toward the thrust bearing portion 24 when the rotor hub 2 and the shaft 4 rotate. Further, herringbone striations are formed in the lower radial bearing portion 19 as radial dynamic-pressure generating grooves 16. Spiral upper-side grooves 16a and spiral lower-side grooves 16b having roughly the same length in the axial direction, connected by bends 16c, are for urging lubricating fluid 14 from either direction toward the bends 16c when the rotor hub 2 and the shaft 4 rotate.

Now, as shown in FIG. 6 so-called pump-in type spiral striations are formed in the thrust bearing portion 24 as thrust dynamic-pressure generating grooves 22, for urging lubricating fluid 14 toward the shaft 4—in other words, in the direction of the upper radial bearing portion 20—when the rotor hub 2 and shaft 4 rotate.

Herein, by the action of the upper radial bearing portion 20 and thrust bearing portion 24, the pressure of the lubricating fluid 14 sustained in the gap continuing from the thrust bearing portion 24 to the upper radial bearing portion 20 is highest adjacent the boundary between the two. Conversely, the pressure is lowest in the lubricating fluid 14 maintained adjacent the axial lower end of the upper radial bearing portion 20, as well as adjacent the outer end radially of the thrust bearing portion 24. Therefore, bubbles remaining in the lubricating fluid 14 sustained in the upper radial bearing portion 20, the thrust bearing portion 24, and at the boundary between them, gradually travel through the first ventilation bore 30 and tapered seal 40 to the low-pressure region just described. The bubbles are discharged to the exterior and prevented from remaining in the lubricating fluid 14.

The radial dynamic-pressure generating grooves 18 shown in FIG. 5 in the upper radial bearing portion 20 are constituted from spiral striations. Instead, as shown in FIG. 7 the radial dynamic-pressure generating grooves 18 can be herringbone striations wherein spiral upper-side grooves 18a1 and spiral lower-side grooves 18b1 are connected by bends 18c1, with the lower-side grooves 18b1 being axially longer than the spiral upper-side grooves 18a1. The bends 18c1 are axially biased (asymmetrical in the axial direction) so as to urge lubricating fluid 14 toward the thrust bearing portion 24 when rotor hub 2 and shaft 4 rotate. And the radial dynamic-pressure generating grooves 16 on the lower radial bearing portion 19 can be herringbone striations. Spiral upper-side grooves 16a1 and spiral lower-side grooves 16b1 that are of roughly the same axial length are connected by bends 16c1, and urge lubricating fluid 14 from either direction toward the bends 16c when the rotor hub 2 and the shaft 4 rotate.

Figure 8:
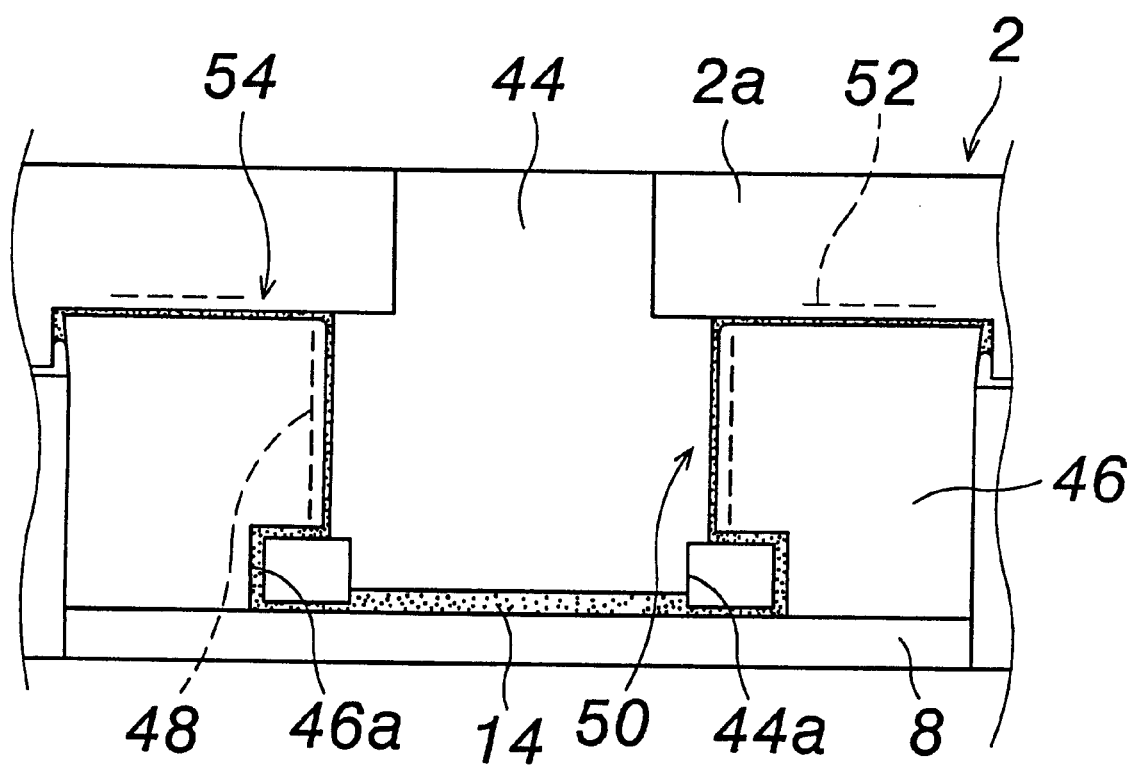
FIG. 8 is a fragmentary vertical section view outlining a principal component configuration of bearing sections in a storage disk drive motor employed in a storage disk drive device of the present invention in a second embodiment.

With reference to FIG. 8 the following explains a second embodiment of the present invention.

FIG. 8 is fragmentary vertical section view schematically showing an outline of the chief-part configuration of bearing components in a storage disk drive motor of the present invention in a second embodiment. Elements that effect the same operations/results as corresponding elements in FIG. 4 are marked identically, and their explanation is omitted.

The configuration of the storage disk drive motor shown in FIG. 8 is approximately the same as that of the foregoing first embodiment of the present invention. In a storage disk drive motor of the present invention in the second embodiment, however, the hollow cylindrical support element 46 that rotatively supports the shaft 44 is formed from a porous, oil-containing metallic material. The lubricant-impregnated material is obtained by pressure forming and sintering machining-powdered graphite/cast iron flakes. In this case, formed in the support element 46 is an annular recess 46a that which receives a ring element 42 fit in an annular notch 44a on the shaft 44, forming a structure that stops the shaft 44 from slipping out. Also, in FIG. 8, likewise with FIG. 4 in illustrating a motor in the first embodiment of the present invention, radial dynamic pressure-generating grooves 48 and thrust dynamic pressure-generating grooves 52 are for convenience indicated by hidden lines. Their specific shapes/configurations will later be described in detail with reference to the drawings.

A blanking (blinding) process may be applied to at least the portion of the upper end face of the support element 46 that faces the thrust dynamic pressure-generating grooves 52 and constitutes the dynamic pressure-acting face of the support element 46, i.e., part of a thrust bearing portion 54. Blanking may also be applied to at least the portion of the inner circumferential surface of the support element 46 that faces the radial dynamic pressure-generating grooves 48 and constitutes a radial bearing 50 portion. The dynamic pressure generated as such acts as a load-bearing pressure. The process of blanking the dynamic pressure-acting face may be carried out by such means as compressing an oil-impregnated metallic material, impregnation-hardening a synthetic polymer, or plating.

Forming the support element 46 from the porous, oil-impregnated metallic material as described above enables communication of the radial bearing 50 portion with the outer atmosphere via holes within the oil-impregnated metallic material. This therefore renders unnecessary a separate communicating channel or like configuration for communicating the radial bearing portion 50 with the outer air. Like the first embodiment of the present invention illustrated in FIG. 4, when filling with the lubricating fluid 14 or when the motor is rotating, bubbles generated within the lubricating fluid 14 sustained in the radial bearing portion 50 are discharged to the bearing exterior through the holes. This prevents the lubricating fluid 14 from leaking out to the exterior of the bearing by, due to temperature elevation in the motor, thermal expansion of the bubbles. Thus the motor configuration is further simplified, which serves in cost reduction.

Further, blanking the dynamic pressure-acting face of the support element 46 prevents load-bearing pressure generated in the radial bearing portion 50 and the thrust bearing portion 54 from escaping to the exterior of the bearing, without compromising the firmness of the bearing.

In addition, forming the support element 46 from the oil-impregnated metallic material further reduces sliding wear arising from the components configuring the radial bearing portion 50 and the thrust bearing portion 54 contacting when the motor rotates at low speed, or is accelerating/decelerating and when sufficient load-bearing pressure cannot be generated.

With reference to FIG. 9 through FIG. 13, the following describes in detail the specific shape and form of the radial bearing portion 50 and the thrust bearing portion 54, as well as the radial dynamic-pressure generating grooves 48 and the thrust dynamic pressure generating grooves 52, indicated by hidden lines in FIG. 8, formed in the respective radial bearing portions 50 and 54.

Figure 9:
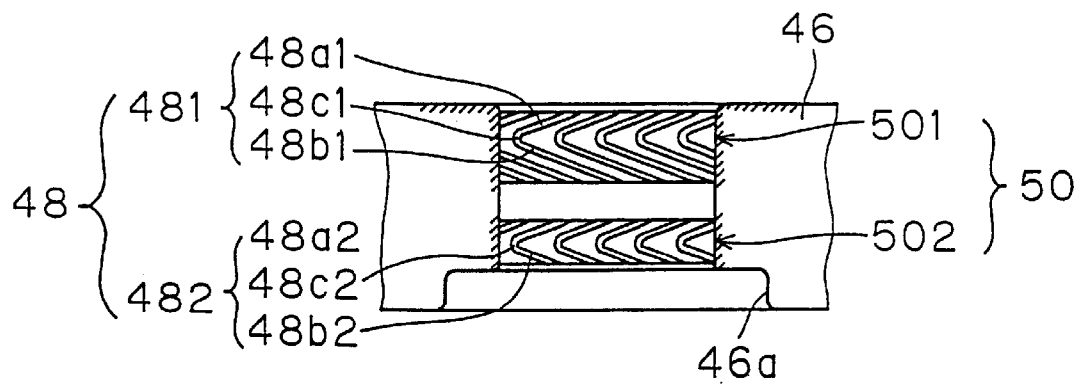
FIG. 9 is a fragmentary section view illustrating a specific example of a radial bearing for the motor shown in FIG. 8.
Figure 10:
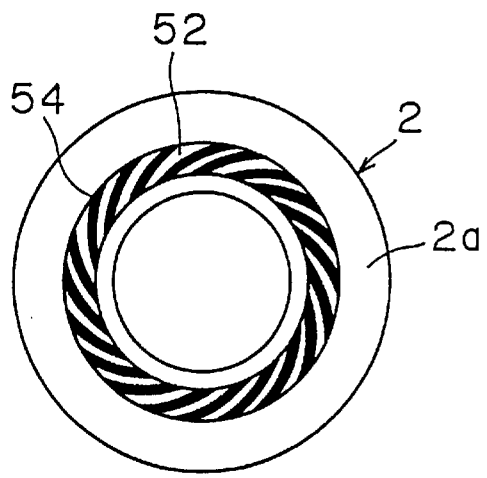
FIG. 10 is a fragmentary section view illustrating a specific example of a thrust bearing for the motor shown in FIG. 8.

For the radial bearing portion 50 in FIG. 9, herringbone striations 481 and 482 are furnished as a pair separated in the axial direction. Spiral upper-side grooves 48a1 and spiral lower-side grooves 48b1 set to be longer axially than the spiral upper-side grooves 48a1, connected by bends 48c1 are formed in the upper radial bearing portion 501 as radial dynamic pressure-generating grooves 48. These herringbone striations 481 are axially biased (asymmetrical in the axial direction) toward the bends 48a1 so as to urge lubricating fluid 14 toward the thrust bearing portion 54 when the rotor hub 2 and the shaft 44 rotate. Spiral upper-side grooves 48a2 and spiral lower-side grooves 48b2 having roughly the same length axially, connected by bends 48c2, are formed in the lower radial bearing portion 502 as radial dynamic pressure-generating grooves 48 also. These herringbone striations 482 are for urging lubricating fluid 14 from either direction toward the bends 48c2 when the rotor hub 2 and the shaft 44 rotate. Further, as shown in FIG. 10, so-called pump-in type spiral striations are formed in the thrust bearing portion 54 as thrust dynamic-pressure generating grooves 52, for urging lubricating fluid 14 toward the shaft 44—in other words, in the upper radial bearing portion 501 direction—when the rotor hub 2 and shaft 44 rotate.

Herein, as indicated by diagonal lines in FIG. 9, the blanking process on the support element 46 formed from the oil-impregnated metallic material is effected on the surface continuing from the thrust bearing portion 54—wherein the pressure within the lubricating fluid 14 is high due to the action of the upper radial bearing portion 501 and the thrust bearing portion 54—to the upper radial bearing portion 501. The surface corresponding to the herringbone striations 482 for the lower radial bearing portion 502 is also blanked.

Figure 11:
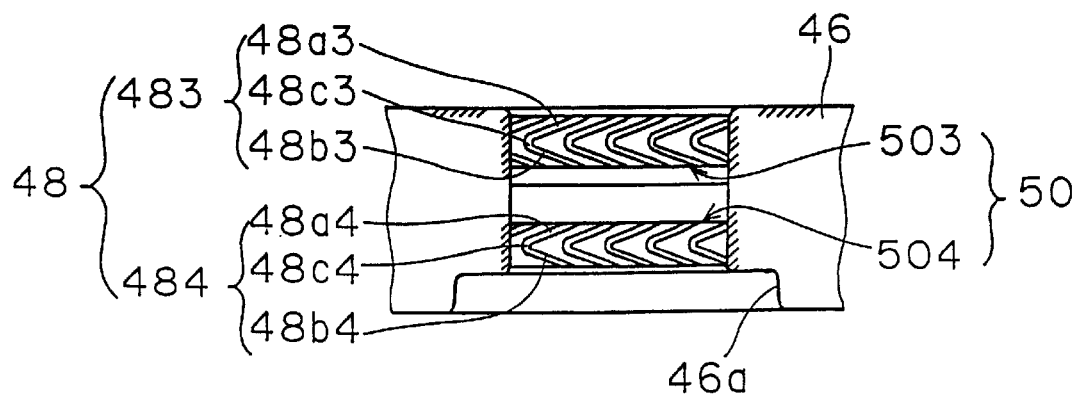
FIG. 11 is a fragmentary section view illustrating another specific example of a radial bearing for the motor shown in FIG. 8.
Figure 12:
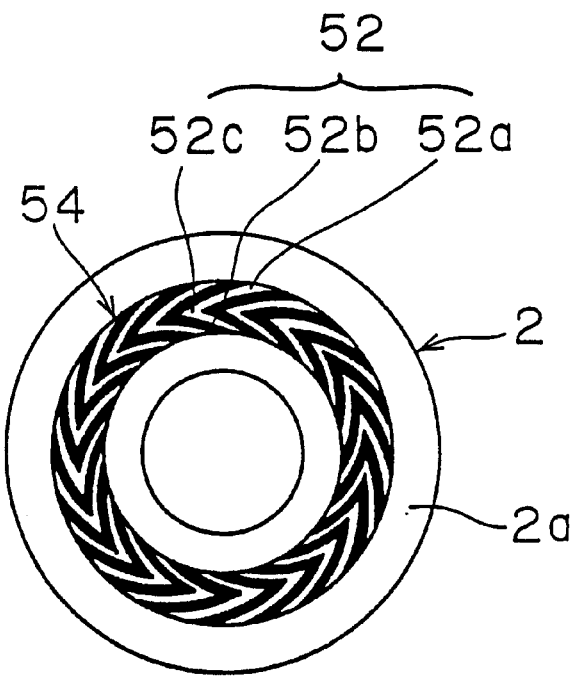
FIG. 12 is a fragmentary section view illustrating another specific example of a thrust bearing for the motor shown in FIG. 8.

In the manner depicted in FIG. 11, spiral upper-side grooves 48a3 and spiral lower-side grooves 48b3 having roughly the same length axially, connected by bends 48c3 can be formed on the upper radial bearing portion 503 as radial dynamic pressure-generating grooves 48. These herringbone striations 483 are for urging lubricating fluid 14 from either direction toward the bends 48c3 when the rotor hub 2 and the shaft 44 rotate. Spiral upper-side grooves 48a4 and spiral lower-side grooves 48b4 having roughly the same length axially, connected by bends 48c4 can be formed on the lower radial bearing portion 504, also as radial dynamic pressure-generating grooves 48. These herringbone striations 484 are for urging lubricating fluid 14 from either direction toward the bends 48c4 when the rotor hub 2 and the shaft 44 rotate. At the same time, as shown in FIG. 12, herringbone striations can make up the thrust dynamic pressure-generating grooves 52. Spiral outer-side grooves 52a and spiral inner-side grooves 52b having roughly the same radial length are connected by bends 52c, and urge lubricating fluid 14 from either direction toward the bends 52c when the rotor hub 2 and the shaft 44 rotate.

Herein, as indicated by diagonal lines in FIG. 11, the blanking process on the support element 46 formed from the oil-impregnated metallic material is effected on the surfaces corresponding to the upper/lower radial bearing portions 503 and 504, as well as to the respective dynamic pressure-generating grooves 483, 484 and 52 of the thrust bearing portion 54.

Figure 13:
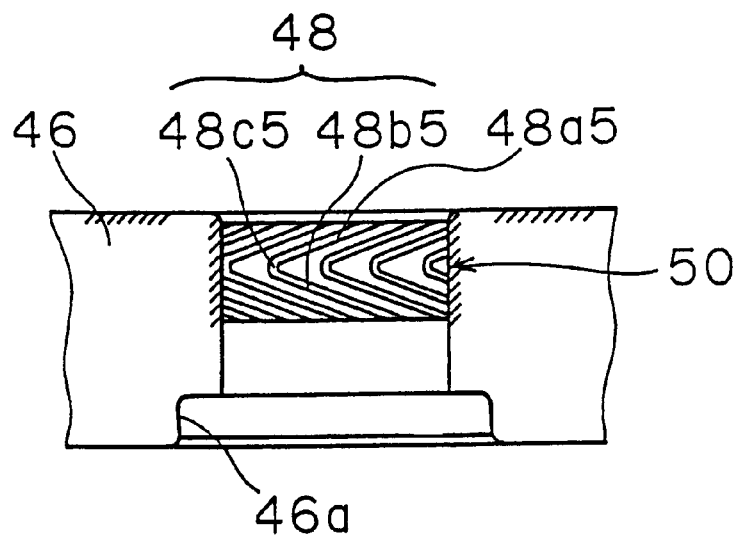
FIG. 13 is a fragmentary section view illustrating still another specific example of a radial bearing for the motor shown in FIG. 8.

In the foregoing specific examples illustrated in FIG. 9 and 11, the configuration described is one in which the radial bearing portions are furnished as an axially separated pair; it may, however, be one in which, as is shown in FIG. 13, only one radial bearing 50 is furnished. Herein, the radial dynamic pressure-generating grooves 48 in the radial bearing 50 may be formed as upper spiral grooves 48a5 and lower spiral grooves 48b5 having roughly the same length in the axial direction, connected by bends 48c5. These herringbone striations develop dynamic pressure within the lubricating fluid 14 by urging the lubricating fluid 14 from either direction toward the bends 48c5 when the rotor hub 2 and the shaft 44 rotate. And thrust dynamic pressure-generating grooves 52 in the thrust bearing 54 may be utilized, the thrust dynamic pressure-generating grooves 52 constituted from herringbone striations for urging lubricating fluid 14 toward the bends 52c depicted in FIG. 12.

Herein, as indicated by diagonal lines in FIG. 13, the blanking process on the support element 46 formed from the oil-impregnated metallic material is effected on the surfaces corresponding to the radial bearing portions 50 and the thrust bearing portion 54, as well as to the respective dynamic pressure-generating grooves 48 and 52.

The above embodiments of the present invention were described taking as an example the type of storage disk drive device in which the storage disk drive motor bracket 12 is mounted on a base element 202 in the storage disk drive device. Needless to say, the present invention may otherwise be applied in a so-called integral-base type storage disk drive device, in which a dual-functioning storage disk drive device base element 202 also serves as the bracket 12.

Further, the fluid intervening among the radial bearing portions 19, 20 and 50, and the thrust bearing portions 24 and 54 may be selected to suit from among air, lubricating oils and magnetic fluids, in accordance with the weighted support pressure and viscosity requirements.

The storage disk drive motor of the present invention establishes a so-called axial-gap type motor configuration wherein a plurality of salient poles projecting axially inward is provided on a rotary component containing a rotor hub. The stator provided on a stationary member and the salient poles are opposed in the axial direction. At the same time a so-called reluctance-type motor configuration is established, in which motor-rotating power is gained by exciting the stator to magnetically attract the salient poles provided on the rotary component. Therefore, the electromagnetic force of the stator magnetically attracting the rotor hub in the axial direction balances the thrust load-bearing force generated in the thrust bearing portions and acting axially outward only. The thrust load-bearing force is thus compensated. In addition, the fact that a rotor magnet is unnecessary in a reluctance-type motor reduces the number of parts and lowers the cost, and at the same time prevents magnetic contamination caused by motor magnet powder from occurring.

Moreover, as a storage disk drive motor, an axial-gap type reluctance motor constituted from salient poles provided on a rotary component, with which the stator is opposed axially, is employed. Thereby, the electromagnetic force of the stator magnetically attracting the rotor hub in the axial direction balances the thrust load-bearing force generated in the thrust bearing portions that acts axially outward only, thus compensating thrust load-bearing force. At the same time, the fact that a rotor magnet is unnecessary in a reluctance-type motor reduces the number of parts and lowers the cost, and meanwhile prevents magnetic contamination caused by motor magnet powder from occurring.

Various details of the present invention may be changed without departing from its spirit or its scope. Furthermore, the foregoing description of the embodiments according to the present invention is provided for illustration only, and not for the purpose of limiting the invention as defined by the appended claims and their equivalents.

What is claimed is:

1. A storage disk drive motor including a stationary member and a rotary member, the rotary member made from a non-magnetic material and carrying at least one storage disk and rotatable relative to the stationary member, the storage disk drive motor comprising:

a plurality of salient poles each including a laminated plurality of thin, wafer-shaped magnetic elements, provided circumferentially spaced on said rotary member and projecting from said rotary member axially inward;

a stator disposed on said stationary member and axially opposing said plurality of salient poles, such that electromagnetic force developed by energization of the stator magnetically attracts said rotary member axially inward; and a thrust bearing for generating thrust load bearing force acting axially outward, wherein magnetic attractive force of said stator is balanced with thrust load-bearing force developed in said thrust bearing.

2. A storage disk drive motor as set forth in claim 1, wherein said rotary member is provided with a rotor hub and a shaft for integrally rotating with the rotor hub, and said stationary member is provided with a cylindrical sleeve having an inner circumferential surface radially opposing an outer circumferential surface of said shaft and an upper-end face axially opposing a bottom surface of said rotor hub.

3. A storage disk drive motor as set forth in claim 2, wherein said rotor hub is made from a magnetic material, and said plurality of salient poles are integrally formed with the bottom surface of said rotor hub.

4. A storage disk drive motor as set forth in claim 2, further comprising a radial bearing for generating radial load bearing force acting radially, wherein said radial bearing comprises a fluid interposed between the outer circumferential surface of said shaft and the inner circumferential surface of said sleeve radially opposed thereto, and dynamic pressure-generating grooves formed on at least one of the outer circumferential surface of said shaft and the inner circumferential surface of said sleeve, for generating bearing force to support radially oriented loads acting on said fluid in response to rotation of said rotary member.

5. A storage disk drive motor as set forth in claim 4, wherein said sleeve is formed from a porous, oil-impregnated metallic material.

6. A storage disk drive motor as set forth in claim 5, wherein a blanking process is applied to portions of said sleeve configuring said radial bearing and said thrust bearing.

7. A storage disk drive motor as set forth in claim 4, wherein said radial bearing is formed as an axially separated pair of radial bearing sections, and an air intervention is formed between said radial bearing sections, such that ventilation bores open to communicate said radial bearing sections with the exterior atmosphere.

8. A storage disk drive motor as set forth in claim 2, wherein said thrust bearing comprises a fluid interposed between the bottom surface of said rotor hub and the upper end face of said sleeve axially opposed thereto, and dynamic pressure-generating grooves formed on at least one of the bottom surface of said rotor hub and the upper end face of said sleeve, for generating bearing force to support thrust-oriented loads acting on said fluid in response to rotation of said rotary member.

9. A storage disk drive motor as set forth in claim 2, wherein said sleeve is formed from one of copper, copper alloys, or stainless steel.

10. An electric motor including a stationary member and a rotary member rotatable relative to the stationary member, the motor comprising: a plurality of salient poles each including a laminated plurality of thin, wafer-shaped magnetic elements, provided on said rotary member and projecting from said rotary member axially inward;
a stator disposed on said stationary member and axially opposing said plurality of salient poles, such that electromagnetic force developed by energization of the stator magnetically attracts said rotary member axially inward; and
a thrust bearing for generating thrust load bearing force acting axially outward, wherein magnetic attractive force of said stator is balanced with thrust load-bearing force developed in said thrust bearing.

11. An electric motor as set forth in claim 10 wherein said rotary member includes a substantially cylindrical rod-shaped shaft, and said stationary member includes a substantially hollow cylindrical sleeve surrounding the shaft; the electric motor further comprising a radial bearing including a fluid interposed between the outer circumferential surface of said shaft and the inner circumferential surface of said sleeve radially opposed thereto, and dynamic pressure generating grooves formed on at least one of the outer circumferential surface of said shaft and the inner circumferential surface of said sleeve, for generating bearing force to support radially oriented loads acting on said fluid in response to rotation of said rotary member.

12. An electric motor as set forth in claim 11, wherein said rotary member further includes a rotor hub; and said thrust bearing includes a fluid interposed between a bottom surface of said rotor hub and an upper end face of said sleeve axially opposed thereto, and dynamic pressure-generating grooves formed on at least one of the bottom surface of said rotor hub and the upper end face of said sleeve for generating bearing force to support thrust-oriented loads acting on said fluid in response to rotation of said rotary member.

13. A storage disk drive device for driving a data storage disk and for accessing data on the disk for reading or writing data thereon, and including a base plate, a storage disk driving motor and a data read or write mechanism; wherein said storage disk driving motor comprises:
a stationary member fixedly coupled with the base plate;
a rotary member made from a non-magnetic material, said rotary member rotatable relative to the stationary member, and having a rotor hub for supporting a data storage disk;
a plurality of salient poles each including a laminated plurality of thin, wafer-shaped magnetic elements fastened to said rotor hub circumferentially spaced along its bottom surface thereby projecting axially inward;
a stator disposed on said stationary member and axially opposing said plurality of salient poles, such that electromagnetic force developed by energization of the stator magnetically attracts said rotary member axially inward; and
a thrust bearing for generating thrust load bearing force that acts axially outward, wherein magnetic attractive force of said stator is balanced with thrust load-bearing force developed in said thrust bearing.

14. A storage disk drive device as set forth in claim 13, wherein said rotor hub is made from a magnetic material and said plurality of salient poles are formed integrally with the bottom surface of said rotor hub.

15. A storage disk drive device as set forth in claim 13, further comprising a radial bearing for generating radial load bearing force acting radially, wherein said radial bearing comprises a fluid interposed between the outer circumferential surface of said shaft and the inner circumferential surface of said sleeve radially opposed thereto, and dynamic pressure-generating grooves formed on at least one of the outer circumferential surface of said shaft and the inner circumferential surface of said sleeve, for generating bearing force to support radially oriented loads acting on said fluid in response to rotation of said rotary member.

16. A storage disk drive device as set forth in claim 15, wherein said sleeve is formed from a porous, oil-impregnated metallic material.

17. A storage disk drive device as set forth in claim 1, wherein a blanking process is applied to portions of said sleeve configuring said radial bearing and said thrust bearing.

18. A storage disk drive device as set forth in claim 13, wherein said thrust bearing comprises a fluid interposed between the bottom surface of said rotor hub and the upper end face of said sleeve axially opposed thereto, and dynamic pressure-generating grooves formed on at least one of the bottom surface of said rotor hub and the upper end face of said sleeve for generating bearing force to support thrust-oriented loads acting on said fluid in response to rotation of said rotary member.

19. A storage disk drive device as set forth in claim 13, wherein said sleeve is formed from one of copper, copper alloys, or stainless steel.

20. A storage disk drive device as set forth in claim 13, wherein said radial bearing is formed as an axially separated pair of radial bearing sections, and an air intervention is formed between said radial bearing sections, such that ventilation bores open to communicate said radial bearing sections with the exterior atmosphere.

21. A reluctance motor in a magnetic storage disk drive device configuration including a housing having a support base into which a retaining cylinder is centrally anchored, the reluctance motor comprising:

a stator fitted concentrically around the retaining cylinder onto the support base, said stator having a plurality of circularly spaced axially directed magnetic poles on an end thereof opposite said support base, the poles being wound with stator windings connected to a direct-current drive circuit for sequentially energizing said stator windings;

a support sleeve concentrically fitted into the retaining cylinder and occluded on its base-ward end by a cover, said support sleeve having an axial thrust-bearing surface endwise opposite its base-ward end; and a rotary component including a flanged rotor hub for carrying a storage disk, said rotor hub being configured with a plurality of circularly spaced underside salient poles axially opposing the stator windings on the stator, and said rotor hub having an underside surface axially opposing said thrust-bearing surface of said support sleeve to form a predetermined axial micro-gap therewith; and a shaft fixedly fitted centrally into said rotor hub and concentrically disposed in said support sleeve at a predetermined radial micro-gap from said support sleeve along its inner circumferential surface, said shaft therein having a base-ward end opposing said cover at an axial gap for forming a lubricating fluid reservoir; wherein superficial grooves are scored in one of the axially opposing surfaces forming said axial micro-gap, such that lubricating fluid from the fluid reservoir intervening in the radial micro-gap and the axial micro-gap develops thrust load-bearing dynamic pressure in the axial micro-gap when said rotary component is driven by the drive circuit; and the reluctance motor in the magnetic storage disk drive device configuration is configured such that magnetic attractive force imparted in said salient poles when the drive circuit energizes said stator windings and drawing said rotary component toward said support base balances the thrust load-bearing dynamic pressure into equilibrium.

22. A reluctance motor as set forth in claim 21, wherein said rotor hub is made from a magnetic material, and said plurality of salient poles are formed integrally with the bottom surface of said rotor hub.

23. A reluctance motor as set forth in claim 21, wherein said rotor hub is made from a non-magnetic material, and said plurality of salient poles includes a laminated plurality of thin, wafer-shaped magnetic elements fastened to the bottom surface of said rotor hub.

24. A reluctance motor as set forth in claim 21, wherein superficial grooves are scored in one of radially opposing surfaces of said support sleeve and said shaft forming said radial micro-gap, such that lubricating fluid from the fluid reservoir intervening in the radial micro-gap and the axial micro-gap develops radial load-bearing dynamic pressure in the radial micro-gap when said rotary component is driven by the drive circuit.

25. A reluctance motor as set forth in claim 21, wherein said support sleeve is formed from a porous, oil-impregnated metallic material.

26. A reluctance motor as set forth in claim 5, wherein a blanking process is applied to the surfaces of said support sleeve forming the radial and axial micro-gaps.

27. A reluctance motor as set forth in claim 21, wherein said support sleeve is formed from one of copper, copper alloys, or stainless steel.

* * * * *